United States Patent
Yin et al.

(10) Patent No.: US 9,143,311 B2
(45) Date of Patent: Sep. 22, 2015

(54) TIME SYNCHRONIZATION METHOD, DEVICE, AND SYSTEM

(71) Applicant: Huawei Technologies Co., Ltd., Shenzhen, Guangdong (CN)

(72) Inventors: Jinrong Yin, Shenzhen (CN); Sulin Yang, Shenzhen (CN); Shouwen Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 13/739,783

(22) Filed: Jan. 11, 2013

(65) Prior Publication Data

US 2013/0195443 A1 Aug. 1, 2013

Related U.S. Application Data

(63) Continuation of application No. PCT/CN2012/070814, filed on Feb. 1, 2012.

(51) Int. Cl.
*H04J 3/06* (2006.01)
*H04L 7/00* (2006.01)

(52) U.S. Cl.
CPC .............. *H04L 7/0075* (2013.01); *H04J 3/0638* (2013.01); *H04J 3/0667* (2013.01)

(58) Field of Classification Search
CPC ....................................... H04J 3/0638
See application file for complete search history.

(56) References Cited

U.S. PATENT DOCUMENTS

| | | | |
|---|---|---|---|
| 7,355,998 B2 | 4/2008 | Briancon et al. | |
| 7,580,432 B2 | 8/2009 | Sucha et al. | |
| 7,660,524 B2 | 2/2010 | Kallstenius | |
| 2005/0036254 A1* | 2/2005 | Premerlani et al. | 361/69 |
| 2006/0239285 A1* | 10/2006 | Nomura et al. | 370/408 |
| 2008/0101514 A1* | 5/2008 | Laulainen et al. | 375/354 |
| 2008/0175275 A1 | 7/2008 | Garner et al. | |
| 2009/0297164 A1* | 12/2009 | Horiuchi | 398/154 |
| 2010/0040369 A1* | 2/2010 | Zhao et al. | 398/58 |
| 2010/0098110 A1* | 4/2010 | Mueller | 370/503 |

(Continued)

FOREIGN PATENT DOCUMENTS

| | | |
|---|---|---|
| CN | 101621713 A | 1/2010 |
| CN | 102142891 A | 8/2011 |

(Continued)

OTHER PUBLICATIONS

Geoffrey M. Garner, "IEEE 1588 Version 2", ISPCS Ann Arbor '08, Sep. 24, 2008, 89 pages.

(Continued)

*Primary Examiner* — Nathan Curs

(57) ABSTRACT

The present disclosure provides a time synchronization method, including: acquiring, by a slave device, a first optical fiber transmission delay from a master device to the slave device, and a second optical fiber transmission delay from the slave device to the master device; exchanging a time synchronization signal with the master device, and calculating an initial time offset; adjusting the initial time offset by using the first optical fiber transmission delay and the second optical fiber transmission delay to obtain a corrected time offset; and adjusting a local clock according to the corrected time offset. Embodiments of the present disclosure further provide a corresponding device and system.

15 Claims, 16 Drawing Sheets

(56) References Cited

U.S. PATENT DOCUMENTS

| | | | |
|---|---|---|---|
| 2010/0098111 A1* | 4/2010 | Sun et al. | 370/509 |
| 2011/0052206 A1* | 3/2011 | Zheng | 398/154 |
| 2011/0075685 A1* | 3/2011 | Xu et al. | 370/503 |
| 2011/0150005 A1 | 6/2011 | Chen et al. | |
| 2011/0150476 A1* | 6/2011 | Zhao | 398/63 |
| 2011/0262133 A1* | 10/2011 | Yuan | 398/43 |
| 2011/0274149 A1* | 11/2011 | Xu et al. | 375/222 |

FOREIGN PATENT DOCUMENTS

| | | |
|---|---|---|
| CN | 102244603 A | 11/2011 |
| WO | WO 2011/085585 A1 | 7/2011 |

OTHER PUBLICATIONS

Chongning Na, et al., "Optimal Estimation and Control of Clock Synchronization Following the Precision Time Protocol", 2010 IEEE International Conference on Control Applications Part of 2010 IEEE Multi-Conference on System and Control, Sep. 8-10, 2010, p. 1767-1772.

Francesco Puleio, "An Innovative Synchronization Techique for OpMiGua-based Mobile Backhauls, The IEEE 1588v2 HPTS Scheme", Norwegian University of Science and Technology, Jul. 2, 2010, 111 pages.

"IEEE Standard for a Precision Clock Synchronization Protocol for Networked Measurement and Control Systems", IEEE Std 1588, Jul. 24, 2008, 288 pages.

\* cited by examiner

TIME SYNCHRONIZATION METHOD, DEVICE, AND SYSTEM

CROSS-REFERENCE TO RELATED APPLICATIONS

This application is a continuation of International Application No. PCT/CN2012/070814, filed on Feb. 1, 2012, which is hereby incorporated by reference in its entirety.

TECHNICAL FIELD

The present disclosure relates to the field of communications technologies, and in particular, to a time synchronization method, device, and system.

BACKGROUND

A precision time protocol IEEE 1588v2 defines a time synchronization technology based on data packet transmission. The technology adopts a timestamp mechanism and a master-slave clock solution to encode time for transmission, and meanwhile, utilizes symmetry of network links and delay measurement technologies to implement synchronization of a frequency and time of master and slave clocks.

The IEEE 1588v2 requires optical fibers for transmitting and receiving signals to be strictly symmetric, that is, an optical fiber transmission delay d1 from a master device to a slave device needs to be equal to an optical fiber transmission delay d2 from the slave device to the master device. If d1 is not equal to d2, an error is caused.

In the prior art, in order to improve time synchronization precision of an asymmetric network, a commonly-adopted method is that, at the time of deployment, acceptance and change of a network structure, manually performing a time synchronization compensation operation, which includes: manually measuring a transmission delay of each pair of optical fibers one by one by utilizing a delay measurement device such as an optical time domain reflectometer (OTDR) or an optical frequency domain reflectometer (OFDR), and then manually inputting measured transmission delay data into a time synchronization device, thereby implementing time synchronization compensation.

SUMMARY

Embodiments of the present disclosure provide a time synchronization method, device, and system, to solve a technical problem in an existing time synchronization technology that time synchronization compensation needs to be performed manually.

A time synchronization method includes:
acquiring, by a slave device, a first optical fiber transmission delay from a master device to the slave device, and a second optical fiber transmission delay from the slave device to the master device;
exchanging a time synchronization signal with the master device;
calculating an initial time offset, and adjusting the initial time offset by using the first optical fiber transmission delay d1 and the second optical fiber transmission delay to obtain a corrected time offset; and
adjusting a local clock according to the corrected time offset.

A time synchronization device includes:
a delay acquisition module, configured to acquire a first optical fiber transmission delay from a master device to a slave device, and a second optical fiber transmission delay from the slave device to the master device;
a transceiver module, configured to exchange an optical signal with the master device, where the optical signal includes a time synchronization signal; and
a time synchronization module, configured to calculate an initial time offset, and adjust the initial time offset by using the first optical fiber transmission delay and the second optical fiber transmission delay to obtain a corrected time offset; and adjust a local clock according to the corrected time offset.

A time synchronization system includes:
a master device and a slave device connected through an optical fiber, where
the slave device is configured to exchange an optical fiber transmission delay measurement signal and a time synchronization signal with the master device, and acquire a first optical fiber transmission delay from the master device to the slave device and a second optical fiber transmission delay from the slave device to the master device; calculate an initial time offset; adjust the initial time offset by using the first optical fiber transmission delay d1 and the second optical fiber transmission delay to obtain a corrected time offset; and adjust a local clock according to the corrected time offset; and
the master device is configured to exchange the optical fiber transmission delay measurement signal and the time synchronization signal with the slave device.

In the technical solutions of the embodiments of the present disclosure, the slave device may acquire the first optical fiber transmission delay and the second optical fiber transmission delay between the master and slave devices, so as to correct a time offset, adjust the local clock, and complete the time synchronization. Therefore, online time synchronization compensation may be implemented during a time synchronization process, and a time synchronization compensation operation does not need to be performed manually.

DETAILED DESCRIPTION

An embodiment of the present disclosure provides a time synchronization method. By using the method, a slave device may acquire a first optical fiber transmission delay d1 and a second optical fiber transmission delay d2 between the master and slave devices, so as to correct a time offset, adjust a local clock, and complete time synchronization. Therefore, time synchronization compensation may be implemented during a time synchronization process, and subsequently a time synchronization compensation operation does not need to be performed manually. Embodiments of the present disclosure further provide a corresponding time synchronization device and system. Detailed description is provided in the following separately.

Embodiment 1

Figure 1:
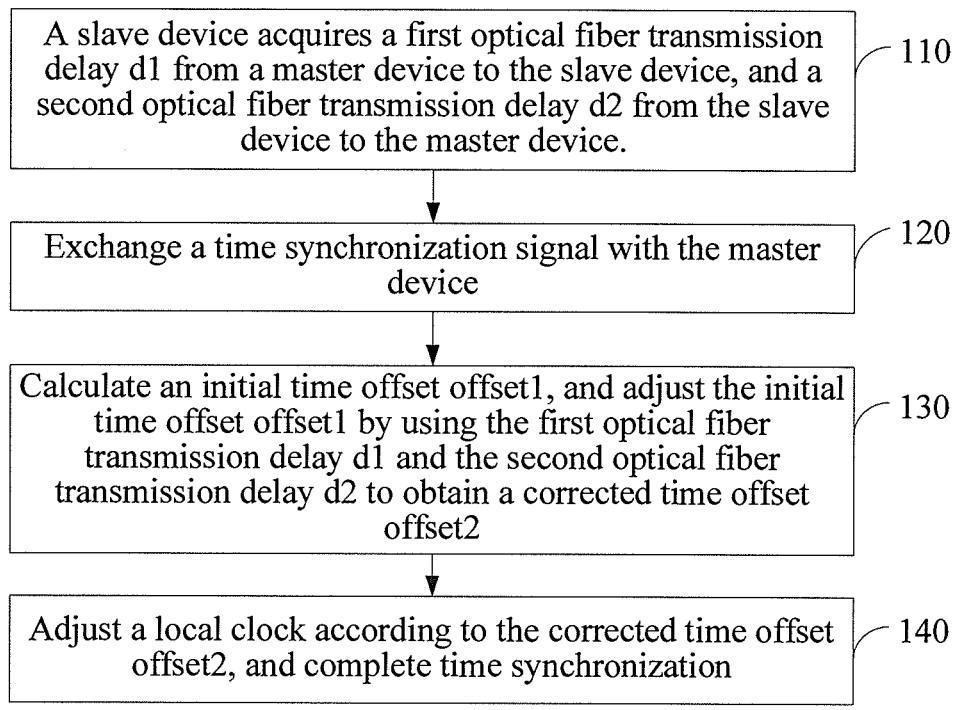
FIG. 1 is a flow chart of a time synchronization method according to Embodiment 1 of the present disclosure.

Referring to FIG. 1, an embodiment of the present disclosure provides a time synchronization method, including:

110: A slave device acquires a first optical fiber transmission delay d1 from a master device to the slave device, and a second optical fiber transmission delay d2 from the slave device to the master device.

In this embodiment, an optical fiber transmission delay measurement module may be disposed in the master device or the slave device, to enable the master device or the slave device to have an optical fiber transmission delay measurement function.

In one manner, the optical fiber transmission delay measurement function may be integrated in both the master device and the slave device. The master device measures the first optical fiber transmission delay d1 from the master device to the slave device, and the slave device measures the second optical fiber transmission delay d2 from the slave device to the master device. The master device sends the measured first optical fiber transmission delay d1 to the slave device.

In another manner, the optical fiber transmission delay measurement function may be integrated only in the master device. The master device measures the first optical fiber transmission delay d1 from the master device to the slave device, and sends the measured first optical fiber transmission delay d1 to the slave device. The slave device may calculate and acquire the second optical fiber transmission delay d2 from the slave device to the master device by using a round trip delay (RTD) measurement function according to round trip delay measurement data in combination with the acquired first optical fiber transmission delay d1. The slave device may also calculate and acquire the second optical fiber transmission delay d2 from the slave device to the master device according to sending and arrival time of a signal, for example, a delay response message, exchanged between the master and slave devices in a time synchronization process in combination with the acquired first optical fiber transmission delay d1.

In another manner, the optical fiber transmission delay measurement function may be integrated only in the slave device, and the slave device measures the second optical fiber transmission delay d2 from the slave device to the master device. The slave device may calculate and acquire the first optical fiber transmission delay d1 from the master device to the slave device by using a round trip delay (RTD) measurement function according to round trip delay measurement data in combination with the acquired second optical fiber transmission delay d2. The slave device may also calculate and acquire the first optical fiber transmission delay d1 from the master device to the slave device according to sending and arrival time of a signal, for example, a delay response message, exchanged between the master and slave devices in a time synchronization process in combination with the acquired second optical fiber transmission delay d2.

An operation of starting the optical fiber transmission delay measurement function to acquire the first optical fiber transmission delay d1 and the second optical fiber transmission delay d2 may be synchronously started when a time synchronization system is started, and may alternatively be started according to an input command, or started according to event triggering, or started regularly, or started periodically. Start time of the optical fiber transmission delay measurement function is not limited in the embodiment of the present disclosure.

120: Exchange a time synchronization signal with the master device.

Figure 2:
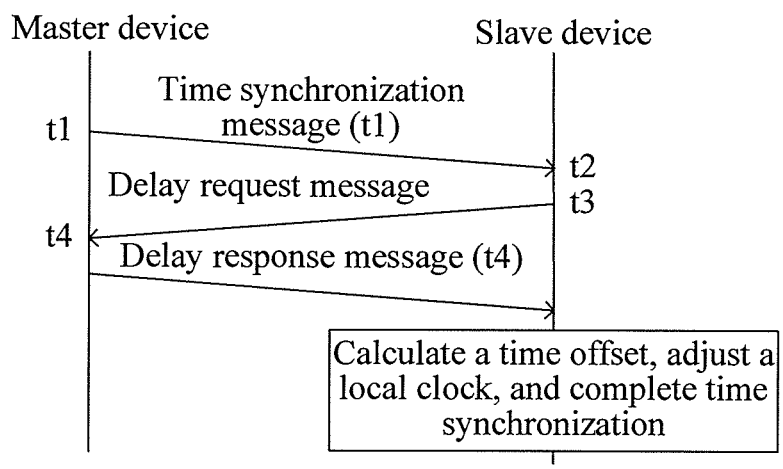
FIG. 2 is a flow chart of exchanging a time synchronization signal by a slave device and a master device according to IEEE 1588v2.

The slave device exchanges the time synchronization signal with the master device according to a technology defined in IEEE 1588v2. A procedure is as shown in FIG. 2, which includes:

1201: The master device sends a time synchronization message to the slave device at time t1, where the time synchronization message carries time synchronization message sending time t1.

1202: The slave device receives the time synchronization message sent by the master device, records time synchronization message arrival time t2, and extracts the time synchronization message sending time t1 from the time synchronization message.

1203: The slave device sends a delay request message to the master device, and records delay request message sending time t3.

1204: The master device receives the delay request message sent by the slave device, and records delay request message arrival time t4.

1205: The master device carries the delay request message arrival time t4 in a delay response message and sends the delay response message to the slave device; and the slave device receives the delay response message and extracts the delay request message arrival time t4.

130: Calculate an initial time offset offset1, and adjust the initial time offset offset1 by using the first optical fiber transmission delay d1 and the second optical fiber transmission delay d2 to obtain a corrected time offset offset2.

The existing IEEE 1588v2 requires optical fibers for transmitting and receiving signals to be symmetric, and an impact of an optical fiber transmission delay d is not taken into consideration when calculating a time offset, that is, it is assumed that the first optical fiber transmission delay d1 is equal to the second optical fiber transmission delay d2. In this specification, a time offset offset obtained in an assumed case that d1=d2 is referred to as the initial time offset, and is marked as offset1. The slave device may calculate and obtain the initial time offset offset1 according to the obtained time synchronization message sending time t1, time synchronization message arrival time t2, delay request message sending time t3, and delay request message arrival time t4. Afterwards, the initial time offset offset1 may be adjusted by using the first optical fiber transmission delay d1 and the second optical fiber transmission delay d2 to obtain the corrected time offset offset2.

Specifically, formulas for calculating the time offset offset are as follows:

$$t2-t1=d1+\text{offset} \quad (1);$$

$$t4-t3=d2-\text{offset} \quad (2)$$

Subtract Formula (2) from Formula (1) to obtain:

$$(t2-t1)-(t4-t3)=2*\text{offset}+(d1-d2) \quad (3),$$

and accordingly obtain:

$$\text{offset} = [(t2-t1)-(t4-t3)-(d1-d2)]/2 \quad (4);$$

Assume that d1=d2, and the initial time offset offset1 may be obtained as follows:

$$\text{offset1} = [(t2-t1)-(t4-t3)]/2 \quad (5);$$

A time offset offset obtained in a case that impacts of d1 and d2 is taken into consideration is referred to as the corrected time offset, and is marked as offset2; and according to Formulas (4) and (5), it may be obtained:

$$\text{offset2} = \text{offset1} - (d1-d2)/2 \quad (6).$$

140: Adjust a local clock according to the corrected time offset offset2, and complete time synchronization.

After the corrected time offset offset2 is obtained, the local clock may be adjusted according to the corrected time offset offset2, and the time synchronization is completed, which may be specifically performed according to IEEE 1588v2.

The starting of the optical fiber transmission delay measurement function in step 110 may be performed prior to the time synchronization message sent by the master device in step 120, and may alternatively be performed posterior to the delay response message sent by the master device in step 120, that is, the optical fiber transmission delay measurement function and the exchanging of the time synchronization signal may be performed separately and independently in random order.

In the foregoing, the embodiment of the present disclosure provides the time synchronization method. By using the method, the slave device may acquire the first optical fiber transmission delay d1 and the second optical fiber transmission delay d2 between the master and slave devices, so as to correct the time offset, adjust the local clock, and complete the time synchronization. Therefore:

a time synchronization error caused by asymmetry of a network, specifically, asymmetry of signal reception and transmission of the optical fibers, may be effectively eliminated; and online time synchronization compensation may be implemented in the time synchronization process, and at the time of deployment, network acceptance and change of a network structure, a time synchronization compensation operation does not need to be performed on each station manually.

Compared with a time synchronization compensation operation performed manually in the prior art, the method in this embodiment has high measurement precision, high accuracy, a short cycle and a low cost, and requires few manpower and material resources. A project implementation problem of IEEE 1588V2 deployment is solved, and a scale project deployment capability is achieved.

Embodiment 2

In this embodiment, an optical fiber transmission delay measurement function is integrated in both a master device and a slave device. The master device measures a first optical fiber transmission delay d1 from the master device to the slave device, and the slave device measures a second optical fiber transmission delay d2 from the slave device to the master device. The master device sends the measured first optical fiber transmission delay d1 to the slave device.

Figure 3:
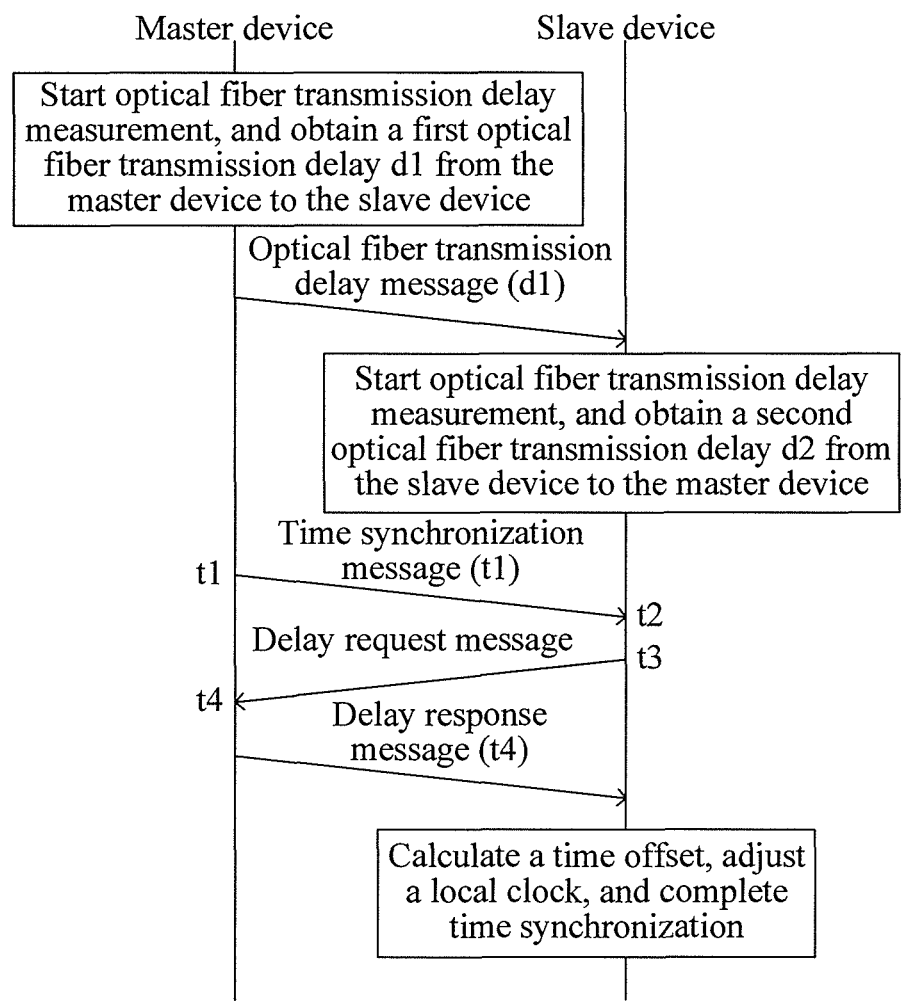
FIG. 3 is a schematic flow chart of a time synchronization method according to Embodiment 2 of the present disclosure.

Reference may be made to FIG. 3 for a specific procedure, which includes:

301: A master device starts an optical fiber transmission delay measurement module integrated in the master device for measuring, and acquires a first optical fiber transmission delay d1 from the master device to a slave device.

302: The master device sends an optical fiber transmission delay message to the slave device, and the first optical fiber transmission delay d1 is carried in the optical fiber transmission delay message sent to the slave device. The slave device receives the optical fiber transmission delay message sent by the master device, and extracts the first optical fiber transmission delay d1 carried in the message.

303: The slave device starts an optical fiber transmission delay module integrated in the slave device for measuring, and acquires a second optical fiber transmission delay d2 from the slave device to the master device.

304: The master device sends a time synchronization message to the slave device at time t1, where the time synchronization message carries time synchronization message sending time t1.

305: The slave device receives the time synchronization message sent by the master device, records time synchronization message arrival time t2, and extracts the time synchronization message sending time t1 from the time synchronization message.

306: The slave device sends a delay request message to the master device, and records delay request message sending time t3.

307: The master device receives the delay request message sent by the slave device, and records delay request message arrival time t4.

308: The master device carries the delay request message arrival time t4 in a delay response message and sends the delay response message to the slave device; and the slave device receives the delay response message, and extracts the delay request message arrival time t4.

309: The slave device may calculate a corrected time offset offset2 according to the obtained optical fiber transmission delays d1 and d2, and the obtained time t1, t2, t3, and t4:

$$\begin{aligned}\text{offset2} &= \text{offset1} - (d1-d2)/2 \quad (7)\\ &= [(t2-t1)-(t4-t3)-(d1-d2)]/2.\end{aligned}$$

Optionally, the master device may carry the measured first optical fiber transmission delay d1 in the time synchronization message, and send the measured first optical fiber transmission delay d1 to the slave device together with the time synchronization message sending time t1; and the master device may alternatively carry the measured first optical fiber transmission delay d1 in the delay response message, and send the measured first optical fiber transmission delay d1 to the slave device together with the delay request message arrival time t4.

In the foregoing procedure, an operation of starting the optical fiber transmission delay measurement function by the master device or the slave device may be synchronously started when a time synchronization system is started, and may alternatively be started according to an input command, or started according to event triggering, or started regularly, or started periodically.

The starting of the optical fiber transmission delay measurement function may be performed prior to the time synchronization message, and may alternatively be performed posterior to the delay response message, that is, the optical fiber transmission delay measurement function and the exchanging of the time synchronization signal may be performed separately and independently in random order.

The master device may start the optical fiber transmission delay measurement function prior to the slave device, and may also start the optical fiber transmission delay measurement function posterior to the slave device, and the master device and the slave device may also start the optical fiber transmission delay measurement function at the same time, that is, both the master device and the slave device may independently start the optical fiber transmission delay measurement function without influencing each other.

Embodiment 3

In this embodiment, an optical fiber transmission delay measurement function is integrated only in a master device. The master device measures a first optical fiber transmission delay d1 from the master device to a slave device, and sends the measured first optical fiber transmission delay d1 to the slave device. A second optical fiber transmission delay d2 from the slave device to the master device is acquired by the slave device in other manners.

Figure 4:
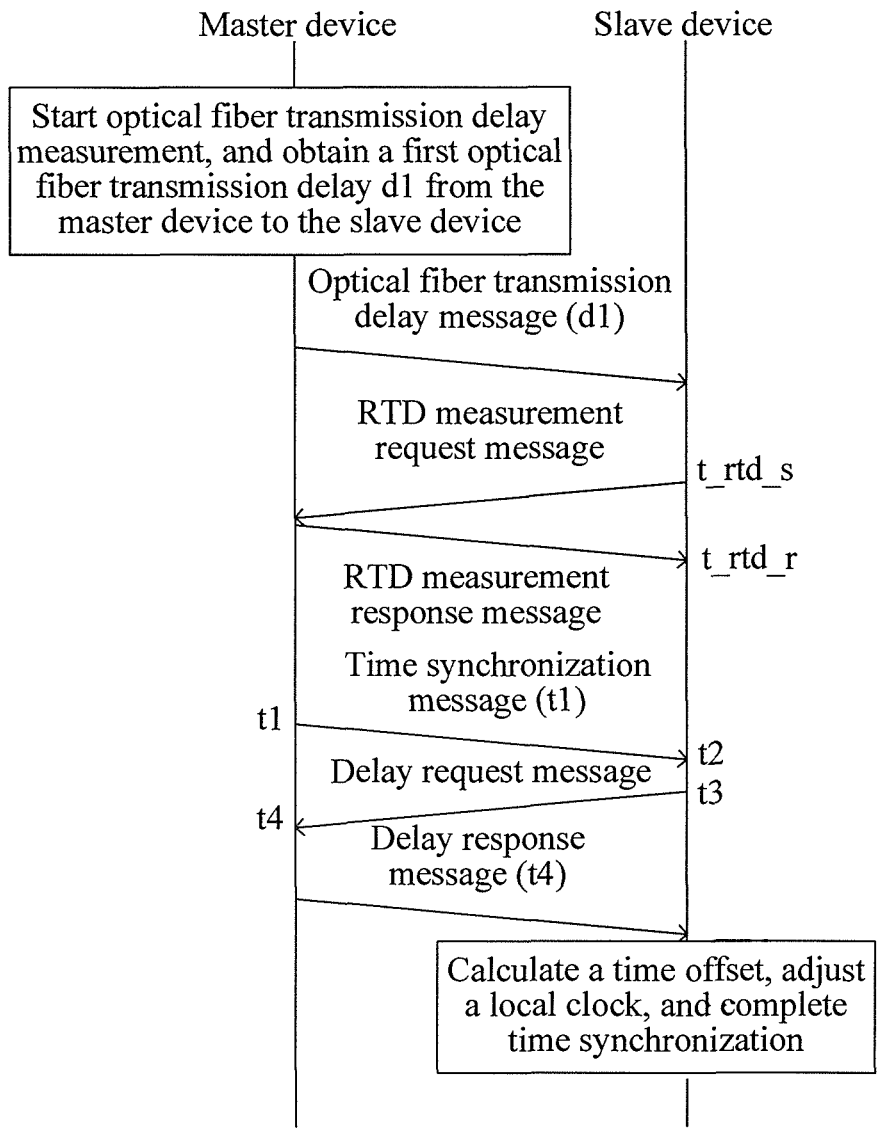
FIG. 4 is a schematic flow chart of a time synchronization method according to Embodiment 3 of the present disclosure.

In one manner, the slave device may start a round trip delay (RTD) measurement function, and calculate and acquire the second optical fiber transmission delay d2 according to round trip delay measurement data in combination with the acquired first optical fiber transmission delay d1. Reference may be made to FIG. 4 for a specific procedure, which includes:

401: A master device starts an optical fiber transmission delay measurement module integrated in the master device for measuring, and acquires a first optical fiber transmission delay d1 from the master device to a slave device.

402: The master device sends an optical fiber transmission delay message to the slave device, and the first optical fiber transmission delay d1 is carried in the optical fiber transmission delay message sent to the slave device. The slave device receives the optical fiber transmission delay message sent by the master device, and extracts the first optical fiber transmission delay d1 carried in the message.

403: The slave device sends a round trip delay (RTD) measurement request message to the master device, and records RTD measurement request message sending time t-rtd-s.

404: After receiving the RTD measurement request message, the master device replies an RTD measurement response message to the slave device; the slave device receives the RTD measurement response message replied by the master device, and records RTD measurement response message arrival time t-rtd-r.

405: The master device sends a time synchronization message to the slave device at time t1, where the time synchronization message carries time synchronization message sending time t1.

406: The slave device receives the time synchronization message sent by the master device, records time synchronization message arrival time t2, and extracts the time synchronization message sending time t1 from the time synchronization message.

407: The slave device sends a delay request message to the master device, and records delay request message sending time t3.

408: The master device receives the delay request message sent by the slave device, and records delay request message arrival time t4.

409: The master device carries the delay request message arrival time t4 in a delay response message and sends the delay response message to the slave device; and the slave device receives the delay response message, and extracts the delay request message arrival time t4.

410: The slave device calculates a second optical fiber transmission delay d2 according to the first optical fiber transmission delay d1, the RTD measurement request message sending time t-rtd-s, and the RTD measurement response message arrival time t-rtd-r:

$$d2 = t\_rtd\_r - t\_rtd\_s - d1 \quad (8).$$

Afterwards, a corrected time offset offset2 is calculated according to the obtained optical fiber transmission delays d1 and d2, and the obtained time t1, t2, t3, and t4:

$$\text{offset2} = \text{offset1} - (d1 - d2)/2 \quad (7)$$
$$= [(t2 - t1) - (t4 - t3) - (d1 - d2)]/2$$

Optionally, the master device may carry the measured first optical fiber transmission delay d1 in the time synchronization message, and send the measured first optical fiber transmission delay d1 to the slave device together with the time synchronization message sending time t1; and the master device may alternatively carry the measured first optical fiber transmission delay d1 in the delay response message, and send the measured first optical fiber transmission delay d1 to the slave device together with the delay request message arrival time t4.

In the foregoing procedure, an operation of starting the optical fiber transmission delay measurement function by the master device may be synchronously started when a time synchronization system is started, and may alternatively be started according to an input command, or started according to event triggering, or started regularly, or started periodically.

The starting of the optical fiber transmission delay measurement function may be performed prior to the time synchronization message, and may alternatively be performed posterior to the delay response message, that is, the optical fiber transmission delay measurement function and the exchanging of the time synchronization signal may be performed separately and independently in random order.

The starting of the optical fiber transmission delay measurement function by the master device may be performed prior to the starting of the RTD measurement function by the slave device, and may alternatively be performed posterior to the starting of the RTD measurement function by the slave device, and the starting of the optical fiber transmission delay measurement function by the master device and the starting of the RTD measurement function by the slave device may alternatively be performed at the same time, that is, the starting of the optical fiber transmission delay measurement function by the master device and the starting of the RTD measurement function by the slave device may be independently performed without influencing each other.

Figure 5:
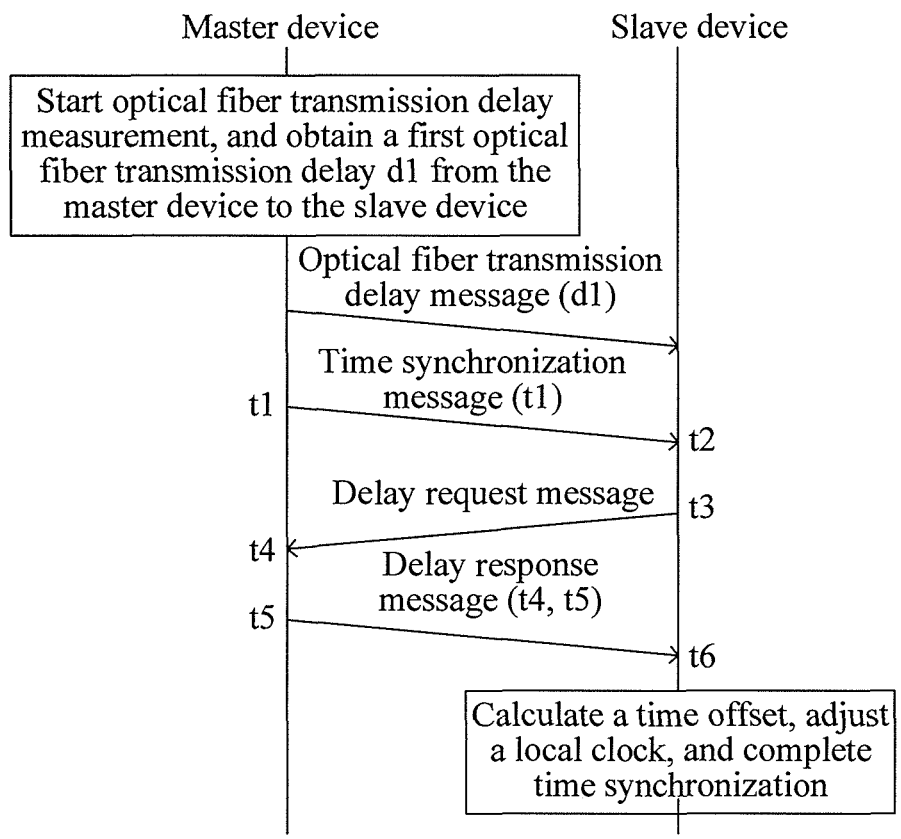
FIG. 5 is a schematic flow chart of another time synchronization method according to Embodiment 3 of the present disclosure.

In another manner, the slave device may also calculate and acquire the second optical fiber transmission delay d2 according to sending and arrival time of a signal, for example, a delay response message, exchanged between the master and slave devices in a time synchronization process in combination with the acquired first optical fiber transmission delay d1. That is, RTD measurement and delay measurement are combined for implementation. Reference may be made to FIG. 5 for a specific procedure, which includes:

501: A master device starts an optical fiber transmission delay measurement module integrated in the master device for measuring, and acquires a first optical fiber transmission delay d1 from the master device to a slave device.

502: The master device sends an optical fiber transmission delay message to the slave device, and the first optical fiber transmission delay d1 is carried in the optical fiber transmission delay message sent to the slave device. The slave device receives the optical fiber transmission delay message sent by the master device, and extracts the first optical fiber transmission delay d1 carried in the message.

503: The master device sends a time synchronization message to the slave device at time t1, where the time synchronization message carries time synchronization message sending time t1.

504: The slave device receives the time synchronization message sent by the master device, records time synchronization message arrival time t2, and extracts the synchronization message sending time t1 from the time synchronization message.

505: The slave device sends a delay request message to the master device, and records delay request message sending time t3.

506: The master device receives the delay request message sent by the slave device, and records delay request message arrival time t4.

507: The master device sends a delay response message to the slave device, where the delay response message carries the delay request message arrival time t4 and also carries delay response message sending time t5.

508: The slave device receives the delay response message, records delay response message arrival time t6, and extracts the delay request message arrival time t4 and the delay response message sending time t5.

509: The slave device calculates a second optical fiber transmission delay d2 according to the first optical fiber transmission delay d1 and the time t3, t4, t5, and t6:

$$d2 = (t6-t3) - (t5-t4) - d1 \quad (9).$$

Afterwards, a corrected time offset offset2 is calculated according to the obtained optical fiber transmission delays d1 and d2, and the obtained time t1, t2, t3, and t4:

$$\text{offset 2} = \text{offset 1} - (d1 - d2)/2 \quad (7)$$
$$= [(t2 - t1) - (t4 - t3) - (d1 - d2)]/2.$$

Optionally, the master device may carry the measured first optical fiber transmission delay d1 in the time synchronization message, and send the measured first optical fiber transmission delay d1 to the slave device together with the time synchronization message sending time t1; and the master device may alternatively carry the measured first optical fiber transmission delay d1 in the delay response message, and send the measured first optical fiber transmission delay d1 to the slave device together with the delay request message arrival time t4 and the delay response message sending time t5.

In the foregoing procedure, an operation of starting the optical fiber transmission delay measurement function by the master device may be synchronously started when a time synchronization system is started, and may alternatively be started according to an input command, or started according to event triggering, or started regularly, or started periodically.

The starting of the optical fiber transmission delay measurement function may be performed prior to the time synchronization message, and may alternatively be performed posterior to the delay response message, that is, the optical fiber transmission delay measurement function and the exchanging of the time synchronization signal may be performed separately and independently in random order.

Embodiment 4

In this embodiment, an optical fiber transmission delay measurement function is integrated only in a slave device, and the slave device measures a second optical fiber transmission delay d2 from the slave device to a master device. A first optical fiber transmission delay d1 from the master device to the slave device is acquired by the slave device in other manners.

Figure 6:
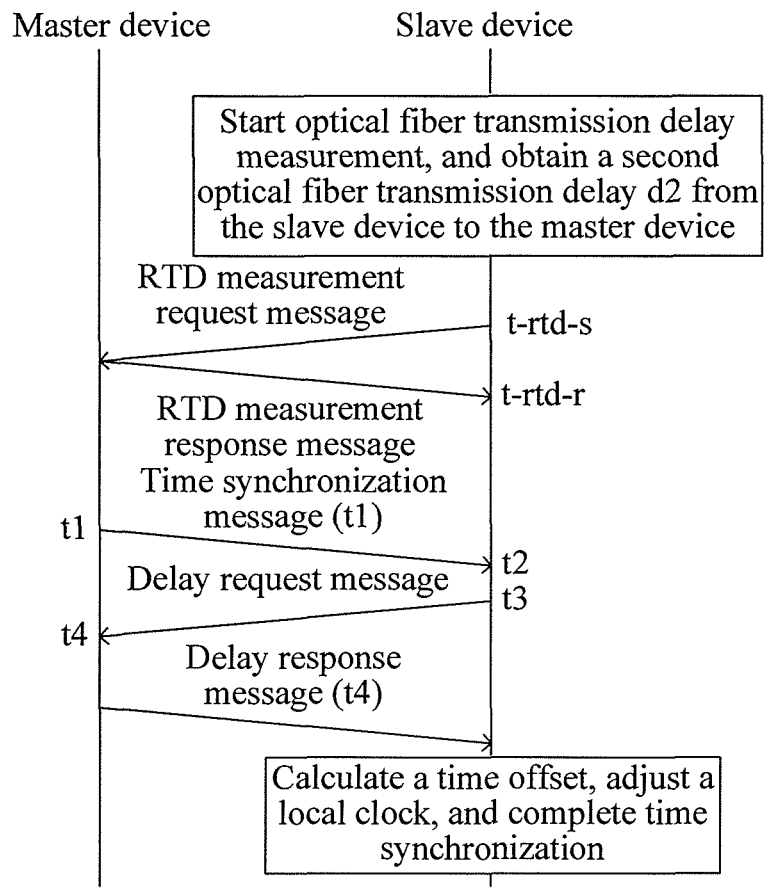
FIG. 6 is a schematic flow chart of a time synchronization method according to Embodiment 4 of the present disclosure.

In one manner, the slave device may start a round trip delay (RTD) measurement function, and calculate and acquire the first optical fiber transmission delay d1 according to round trip delay measurement data in combination with the acquired second optical fiber transmission delay d2. Reference may be made to FIG. 6 for a specific procedure, which includes:

601: A slave device starts an optical fiber transmission delay module integrated in the slave device for measuring, and acquires a second optical fiber transmission delay d2 from the slave device to a master device.

602: The slave device sends a round trip delay (RTD) measurement request message to the master device, and records RTD measurement request message sending time t-rtd-s.

603: After receiving the RTD measurement request message, the master device replies an RTD measurement response message to the slave device; the slave device receives the RTD measurement response message replied by the master device, and records RTD measurement response message arrival time t-rtd-r.

604: The master device sends a time synchronization message to the slave device at time t1, where the time synchronization message carries time synchronization message sending time t1.

605: The slave device receives the time synchronization message sent by the master device, records time synchronization message arrival time t2, and extracts the time synchronization message sending time t1 from the time synchronization message.

606: The slave device sends a delay request message to the master device, and records delay request message sending time t3.

607: The master device receives the delay request message sent by the slave device, and records delay request message arrival time t4.

608: The slave device calculates a first optical fiber transmission delay d1 according to the second optical fiber transmission delay d2, the RTD measurement request message sending time t-rtd-s, and the RTD measurement response message arrival time t-rtd-r:

$$d1 = t\_rtd\_r - t\_rtd\_s - d2 \quad (10).$$

Afterwards, a corrected time offset offset2 is calculated according to the obtained optical fiber transmission delays d1 and d2, and the obtained time t1, t2, t3, and t4:

$$\text{offset 2} = \text{offset 1} - (d1 - d2)/2 \quad (7)$$
$$= [(t2 - t1) - (t4 - t3) - (d1 - d2)]/2$$

In the foregoing procedure, an operation of starting the optical fiber transmission delay measurement function by the slave device may be synchronously started when a time synchronization system is started, and may alternatively be started according to an input command, or started according to event triggering, or started regularly, or started periodically.

The starting of the optical fiber transmission delay measurement function may be performed prior to the time synchronization message, and may alternatively be performed posterior to the delay response message, that is, the optical fiber transmission delay measurement function and the exchanging of the time synchronization signal may be performed separately and independently in random order. The starting of the optical fiber transmission delay measurement function may be prior to the starting of the RTD measurement function, and may also be posterior to the starting of the RTD measurement function.

Figure 7:
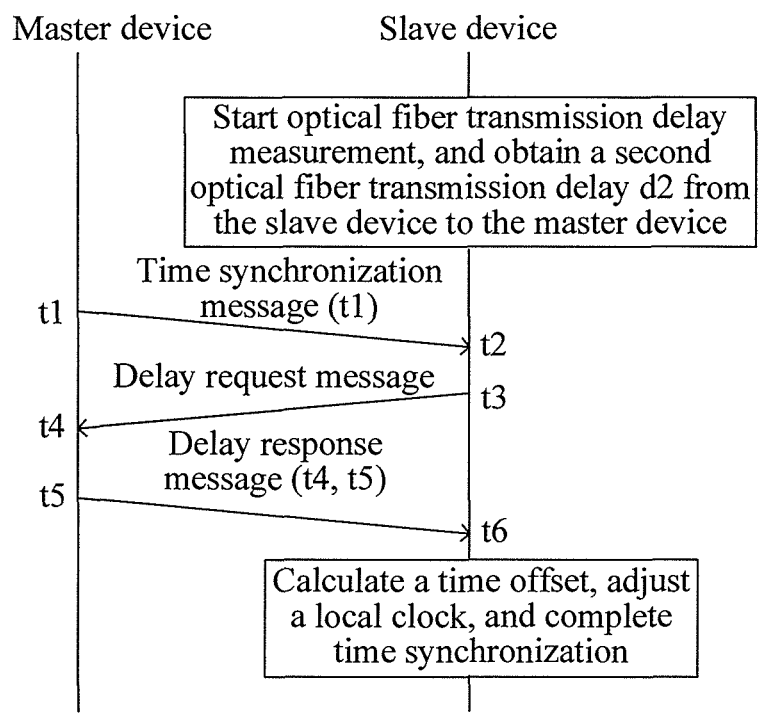
FIG. 7 is a schematic flow chart of another time synchronization method according to Embodiment 4 of the present disclosure.

In another manner, the slave device may also calculate and acquire the first optical fiber transmission delay d1 according to sending and arrival time of a signal, for example, a delay response message, exchanged between the master and slave devices in a time synchronization process in combination with the acquired second optical fiber transmission delay d2. That is, RTD measurement and delay measurement are combined for implementation. Reference may be made to FIG. 7 for a specific procedure, which includes:

701: A slave device starts an optical fiber transmission delay module integrated in the slave device for measuring, and acquires a second optical fiber transmission delay d2 from the slave device to a master device.

702: The master device sends a time synchronization message to the slave device at time t1, where the time synchronization message carries time synchronization message sending time t1.

703: The slave device receives the time synchronization message sent by the master device, records time synchronization message arrival time t2, and extracts the time synchronization message sending time t1 from the time synchronization message.

704: The slave device sends a delay request message to the master device, and records delay request message sending time t3.

705: The master device receives the delay request message sent by the slave device, and records delay request message arrival time t4.

706: The master device sends a delay response message to the slave device, where the delay response message carries the delay request message arrival time t4 and also carries delay response message sending time t5.

707: The slave device receives the delay response message, records delay response message arrival time t6, and extracts the delay request message arrival time t4 and the delay response message sending time t5.

708: The slave device calculates a first optical fiber transmission delay d1 according to the second optical fiber transmission delay d2 and the time t3, t4, t5, and t6:

$$d1=(t6-t3)-(t5-t4)-d2 \tag{11}$$

Afterwards, a corrected time offset offset2 is calculated according to the obtained optical fiber transmission delays d1 and d2, and the obtained time t1, t2, t3, and t4:

$$\text{offset } 2 = \text{offset } 1 - (d1 - d2)/2 \tag{7}$$
$$= [(t2 - t1) - (t4 - t3) - (d1 - d2)]/2.$$

In the foregoing procedure, an operation of starting the optical fiber transmission delay measurement function by the slave device may be synchronously started when a time synchronization system is started, and may alternatively be started according to an input command, or started according to event triggering, or started regularly, or started periodically.

The starting of the optical fiber transmission delay measurement function may be performed prior to the time synchronization message, and may alternatively be performed posterior to the delay response message, that is, the optical fiber transmission delay measurement function and the exchanging of the time synchronization signal may be performed separately and independently in random order.

Embodiment 5

Figure 8A:
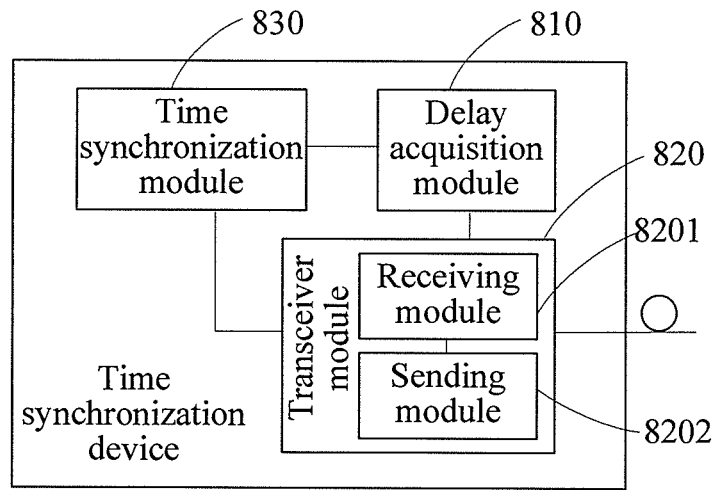
FIGS. 8a to 8d are logical structural diagrams of multiple time synchronization devices according to an embodiment of the present disclosure.

Referring to FIG. 8a, an embodiment of the present disclosure provides a time synchronization device, including:

a delay acquisition module 810, configured to acquire a first optical fiber transmission delay d1 from a master device to a slave device, and a second optical fiber transmission delay d2 from the slave device to the master device;

a transceiver module 820, configured to exchange an optical signal with the master device, where the optical signal includes a time synchronization signal; and a time synchronization module 830, configured to calculate an initial time offset offset1, and adjust the initial time offset offset1 by using the first optical fiber transmission delay d1 and the second optical fiber transmission delay d2 to obtain a corrected time offset offset2; and adjust a local clock according to the corrected time offset offset2, and complete time synchronization.

Further, the transceiver module 820 may specifically be configured to receive a time synchronization message sent by the master device, where the time synchronization message carries time synchronization message sending time t1; send a delay request message to the master device; and receive a delay response message returned by the master device, where the delay response message carries delay request message arrival time t4; and the time synchronization module 830 may specifically be configured to record time synchronization message arrival time t2, and extract the time synchronization message sending time t1 carried in the time synchronization message; record delay request message sending time t3; extract the delay request message arrival time t4 carried in the delay response message; and calculate an initial time offset offset1 according to the time synchronization message sending time t1, the time synchronization message arrival time t2, the delay request message sending time t3, and the delay request message arrival time t4.

The transceiver module 820 may specifically include:

a receiving module 8201, configured to receive an optical signal sent by the master device, for example, receive the time synchronization message and the delay response message; and a sending module 8202, configured to send an optical signal to the master device, for example, send the delay request message.

Figure 8B:
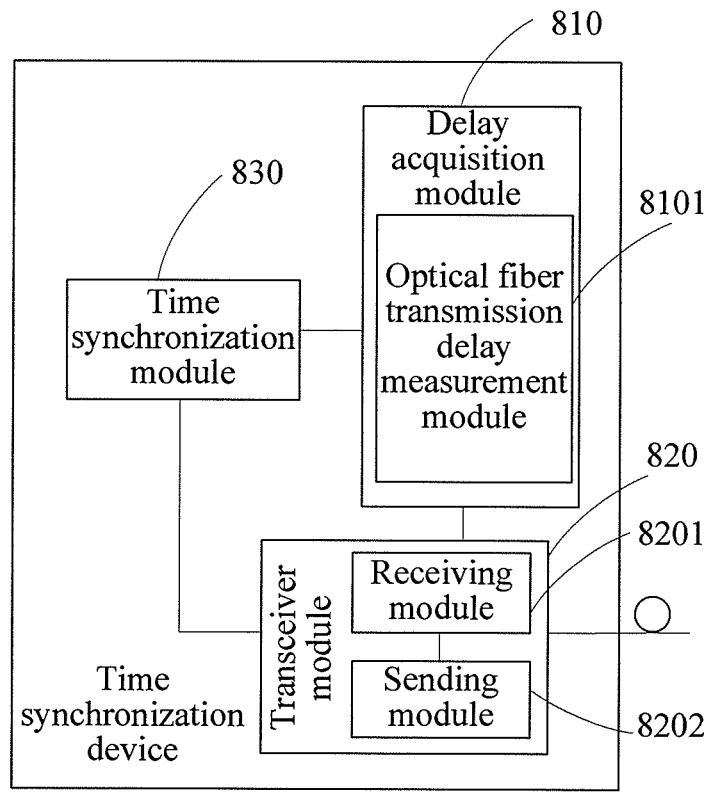

Referring to FIG. 8b, in one implementation manner, the transceiver module 820 may be further configured to receive an optical fiber transmission delay message sent by the master device, where the optical fiber transmission delay message carries the first optical fiber transmission delay d1 measured by the master device by using an optical fiber transmission delay measurement function of the master device; and the delay acquisition module 810 may specifically include: an optical fiber transmission delay measurement module

8101, configured to measure the second optical fiber transmission delay d2 from the slave device to the master device.

The optical fiber transmission delay measurement module may be a module adopting a principle of an optical time domain reflectometer (OTDR) or an optical frequency domain reflectometer (OFDR) to implement optical fiber transmission delay measurement, and capable of transmitting a test signal, monitoring a reflected signal, and acquiring an optical fiber transmission delay between the master and slave devices according to a time difference of the test signal and the reflected signal.

Figure 8C:
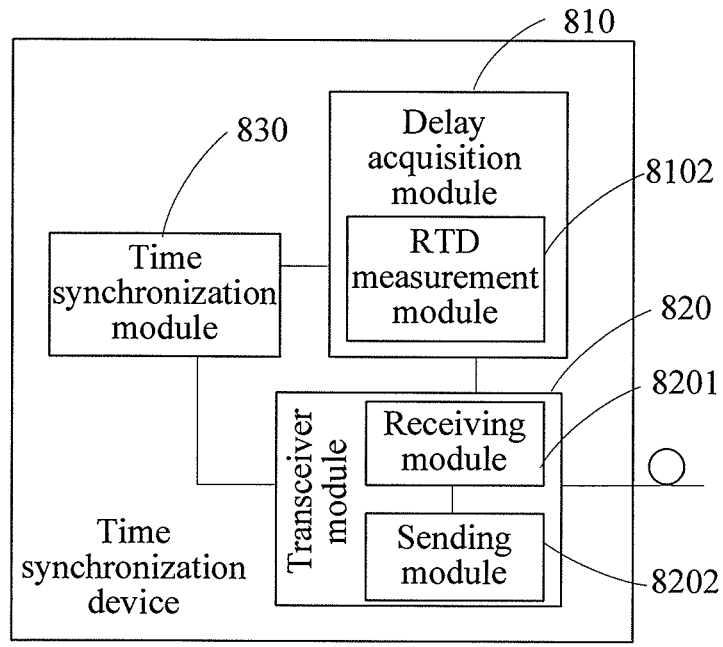

Referring to FIG. 8c, in one implementation manner, the transceiver module 820 may be further configured to receive an optical fiber transmission delay message sent by the master device, where the optical fiber transmission delay message carries the first optical fiber transmission delay d1 measured by the master device by using an optical fiber transmission delay measurement function of the master device; and the delay acquisition module 810 may specifically include: a round trip delay (RTD) measurement module 8102, configured to send a round trip delay (RTD) measurement request message to the master device through the transceiver module, and record RTD measurement request message sending time t-rtd-s; receive an RTD measurement response message replied by the master device through the transceiver module, and record RTD measurement response message arrival time t-rtd-r; and calculate the second optical fiber transmission delay d2 according to the first optical fiber transmission delay d1, the RTD measurement request message sending time t-rtd-s, and the RTD measurement response message arrival time t-rtd-r.

Referring to FIG. 8c, in one implementation manner, the transceiver module 820 may be further configured to receive an optical fiber transmission delay message sent by the master device, where the optical fiber transmission delay message carries the first optical fiber transmission delay d1 measured by the master device by using an optical fiber transmission delay measurement function of the master device; and the delay acquisition module 810 may specifically include: a round trip delay (RTD) measurement module 8102, configured to acquire delay response message sending time t5 carried in the delay response message, and delay response message arrival time t6; and calculate the second optical fiber transmission delay d2 according to the first optical fiber transmission delay d1, the delay request message sending time t3, the delay request message arrival time t4, the delay response message sending time t5, and the delay response message arrival time t6.

Figure 8D:
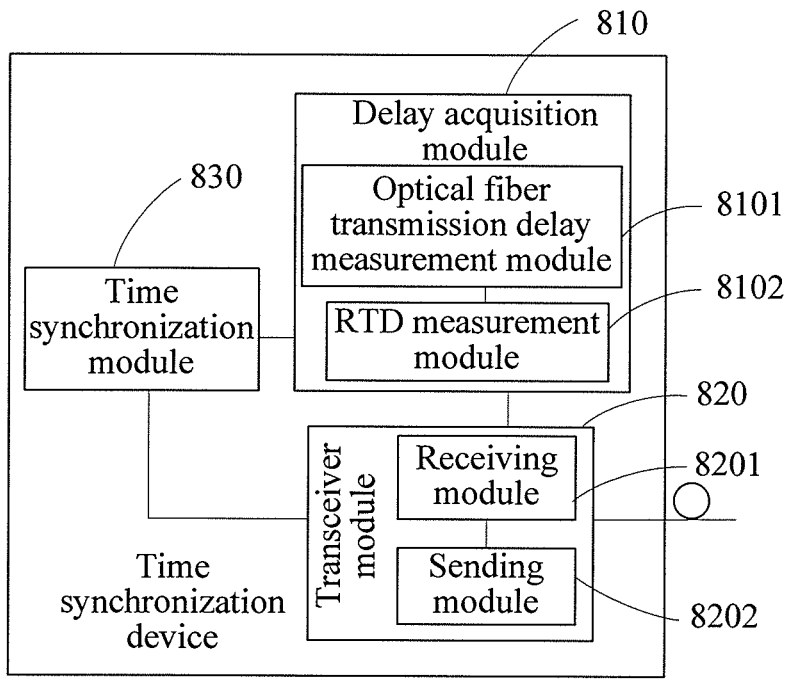

Referring to FIG. 8d, in one implementation manner, the delay acquisition module 810 may specifically include:

an optical fiber transmission delay measurement module 8101, configured to measure the second optical fiber transmission delay d2 from the slave device to the master device; and a round trip delay (RTD) measurement module 8102, configured to send a round trip delay (RTD) measurement request message to the master device through the transceiver module, and record RTD measurement request message sending time t-rtd-s; receive an RTD measurement response message replied by the master device through the transceiver module, and record RTD measurement response message arrival time t-rtd-r; and calculate the first optical fiber transmission delay d1 according to the second optical fiber transmission delay d2, the RTD measurement request message sending time t-rtd-s, and the RTD measurement response message arrival time t-rtd-r.

Referring to FIG. 8d, in one implementation manner, the delay acquisition module 810 may specifically include:

an optical fiber transmission delay measurement module 8101, configured to measure the second optical fiber transmission delay d2 from the slave device to the master device; and a round trip delay (RTD) measurement module 8102, configured to acquire delay response message sending time t5 carried in the delay response message, and delay response message arrival time t6; and calculate the first optical fiber transmission delay d1 according to the second optical fiber transmission delay d2, the delay request message sending time t3, the delay request message arrival time t4, the delay response message sending time t5, and the delay response message arrival time t6.

In the foregoing, the embodiment of the present disclosure provides the time synchronization device. The device may acquire the first optical fiber transmission delay d1 and the second optical fiber transmission delay d2 between the master and slave devices, so as to correct a time offset, adjust the local clock, and complete the time synchronization. Therefore:

a time synchronization error caused by asymmetry of a network, specifically, asymmetry of signal reception and transmission of the optical fibers, may be effectively eliminated; and online time synchronization compensation may be implemented in a time synchronization process, and at the time of deployment, network acceptance and change of a network structure, a time synchronization compensation operation does not need to be performed on each station manually.

Compared with a time synchronization compensation operation performed manually in the prior art, the technical solution in this embodiment has high measurement precision, high accuracy, a short cycle and a low cost, and requires few manpower and material resources. A project implementation problem of IEEE 1588V2 deployment is solved, and a scale project deployment capability is achieved.

Embodiment 6

Figure 9A:
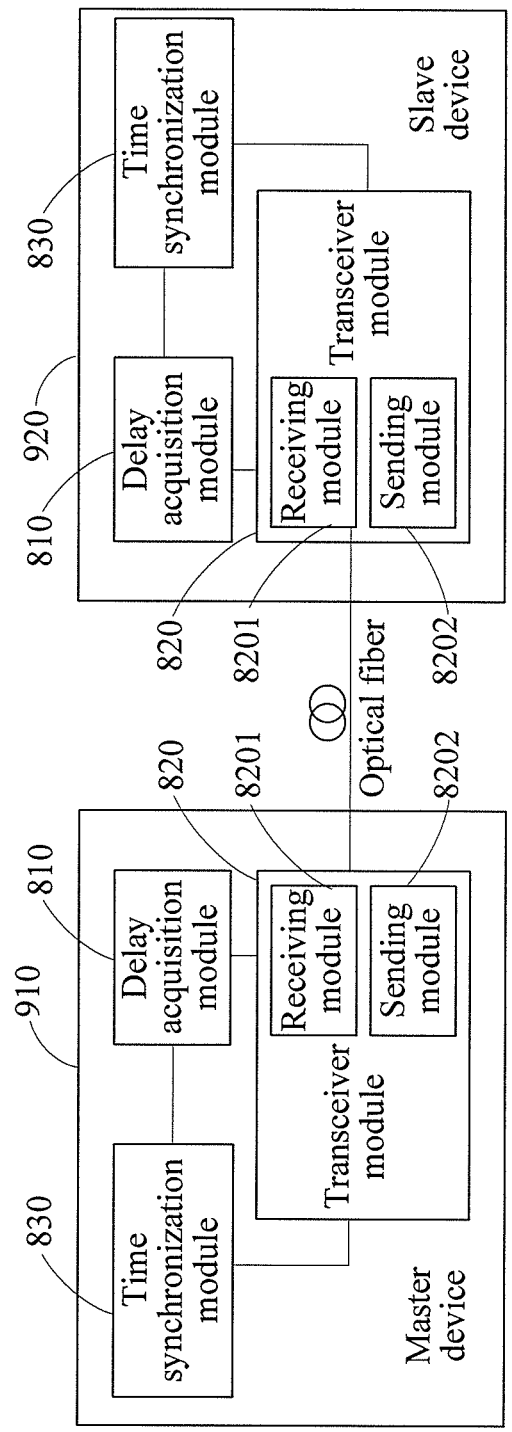
FIGS. 9a to 9i are logical structural diagrams of multiple time synchronization systems according to an embodiment of the present disclosure.

Referring to FIG. 9a, an embodiment of the present disclosure provides a time synchronization system, including: a master device 910 and a slave device 920 connected through an optical fiber. The slave device 920 is configured to exchange an optical fiber transmission delay measurement signal and a time synchronization signal with the master device 910, and acquire a first optical fiber transmission delay d1 from the master device to the slave device and a second optical fiber transmission delay d2 from the slave device to the master device; calculate an initial time offset offset1; adjust the initial time offset offset1 by using the first optical fiber transmission delay d1 and the second optical fiber transmission delay d2 to obtain a corrected time offset of and adjust a local clock according to the corrected time offset offset2, and complete time synchronization. The master device 910 is configured to exchange the optical fiber transmission delay measurement signal and the time synchronization signal with the slave device 920.

A delay acquisition module 810 is disposed in the master device or the slave device, and the delay acquisition module 810 may specifically include one or two of an optical fiber transmission delay measurement module 8101 and an RTD measurement module 8102.

Figure 9B:
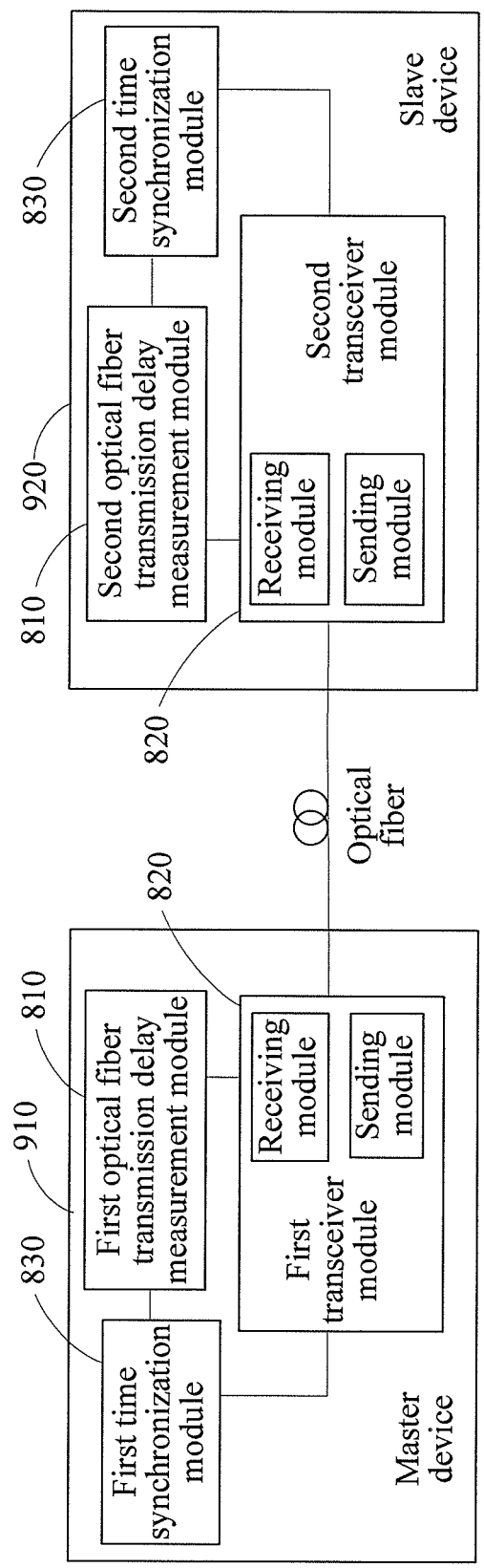

In one manner, the optical fiber transmission delay measurement module 8101 is disposed in both the master device and the slave device, which is as shown in FIG. 9b.

The master device includes: a first optical fiber transmission delay measurement module, a first transceiver module, and a first time synchronization module. The slave device includes: a second optical fiber transmission delay measurement module, a second transceiver module, and a second time synchronization module. The first transceiver module and the second transceiver module are connected through an optical fiber.

Figure 9C:
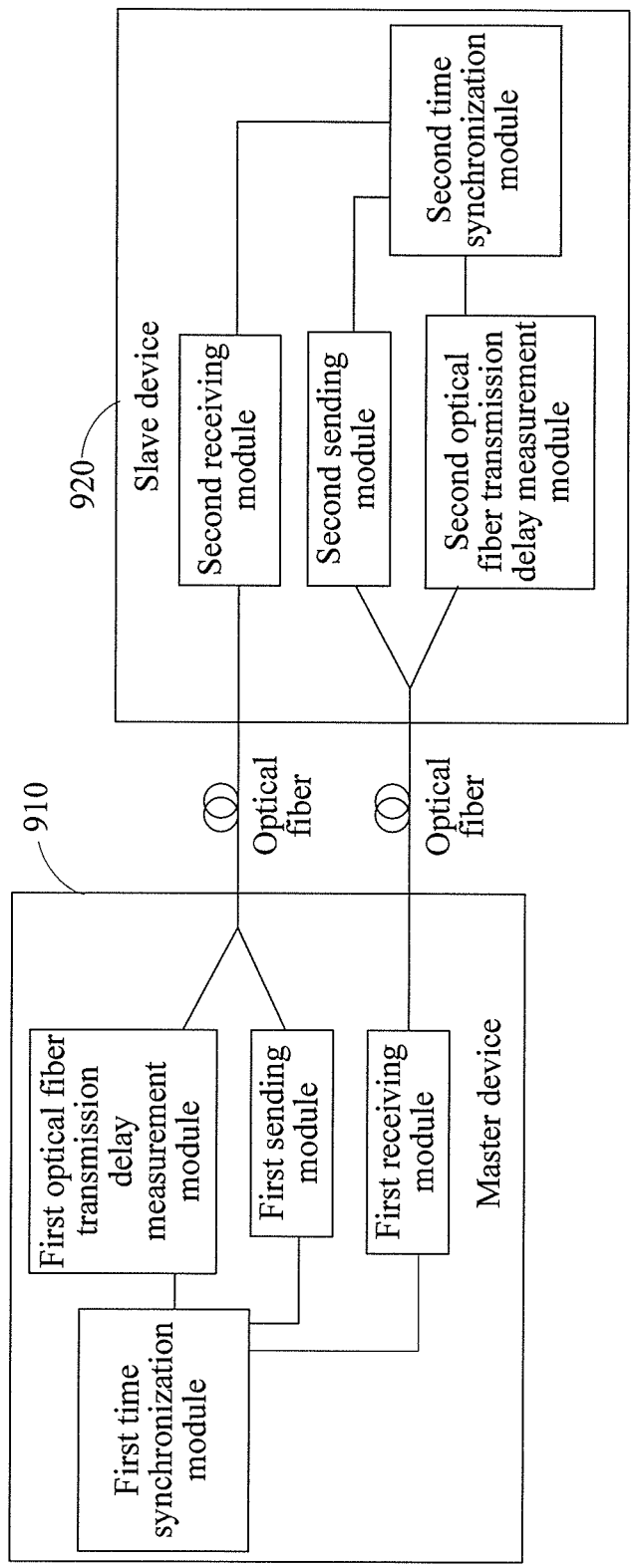
Figure 9D:
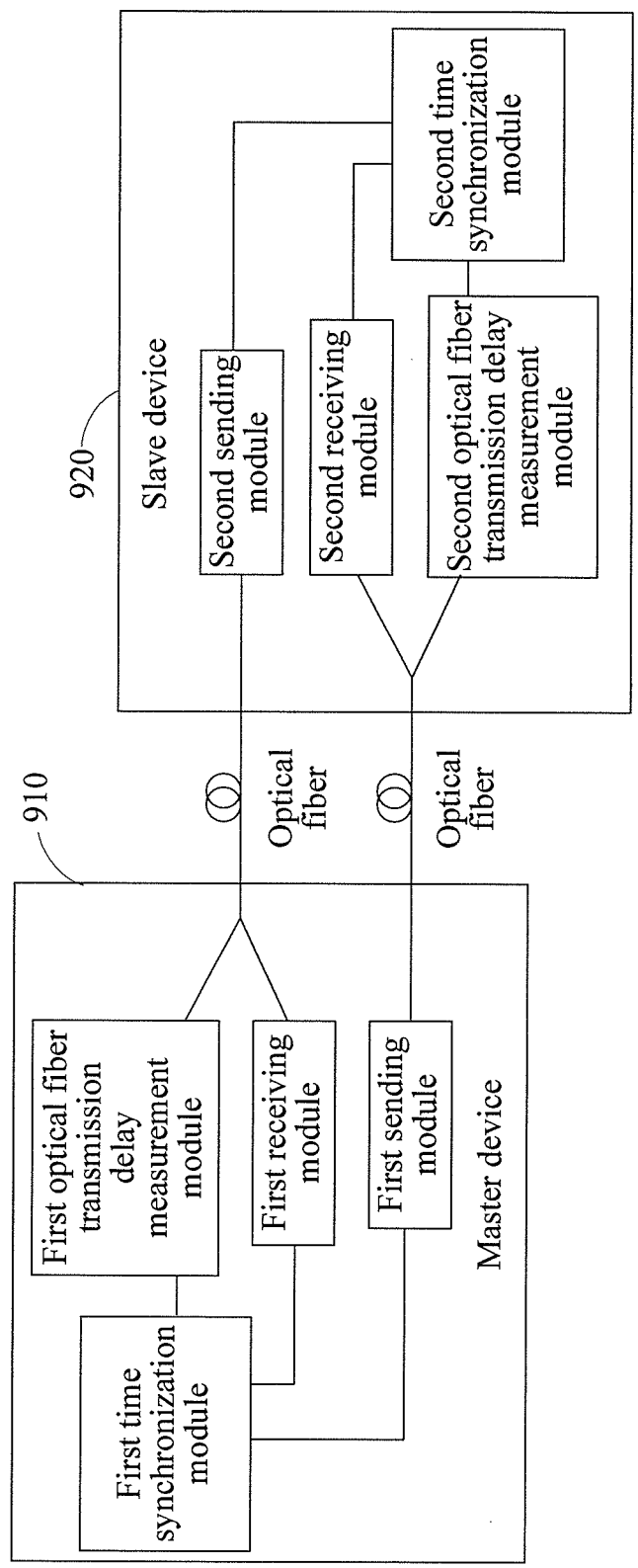

As shown in FIG. 9c or 9d, in specific implementation, the first transceiver module may include a first receiving module and a first sending module, and the second transceiver module may include a second receiving module and a second sending module. The first receiving module and the second sending module are connected through an optical fiber, and the first sending module and the second receiving module are connected through an optical fiber.

The first sending module and the second sending module implement a data sending function, and separately receive an electrical signal from the first time synchronization module and the second time synchronization module or other peripheral modules (not shown in the figure), convert the electrical signal into an optical signal that may be transmitted in an optical fiber, and send the optical signal to the optical fibers connected to the first sending module and the second sending module. The first receiving module and the second receiving module implement a data receiving function, and separately receive an optical signal from the optical fibers connected to the first receiving module and the second receiving module, convert the optical signal into an electrical signal, and separately output the electrical signal to the first time synchronization module and the second time synchronization module or other peripheral modules (not shown in the figure).

The first optical fiber transmission delay measurement module measures the optical fiber transmission delay from the master device to the slave device, and the second optical fiber transmission delay measurement module measures the optical fiber transmission delay from the slave device to the master device. The optical fiber transmission delay measurement module may adopt a principle of an optical time domain reflectometer (OTDR) or an optical frequency domain reflectometer (OFDR) to implement optical fiber transmission delay measurement, that is, to transmit a test signal, monitor a reflected signal, and acquire the optical fiber transmission delay from the master device to the slave device or from the slave device to the master device according to a time difference between the test signal and the reflected signal. The first optical fiber transmission delay measurement module outputs the measured first optical fiber transmission delay d1 to the first time synchronization module, and the second optical fiber transmission delay measurement module outputs the measured second optical fiber transmission delay d2 to the second time synchronization module.

Figure 9E:
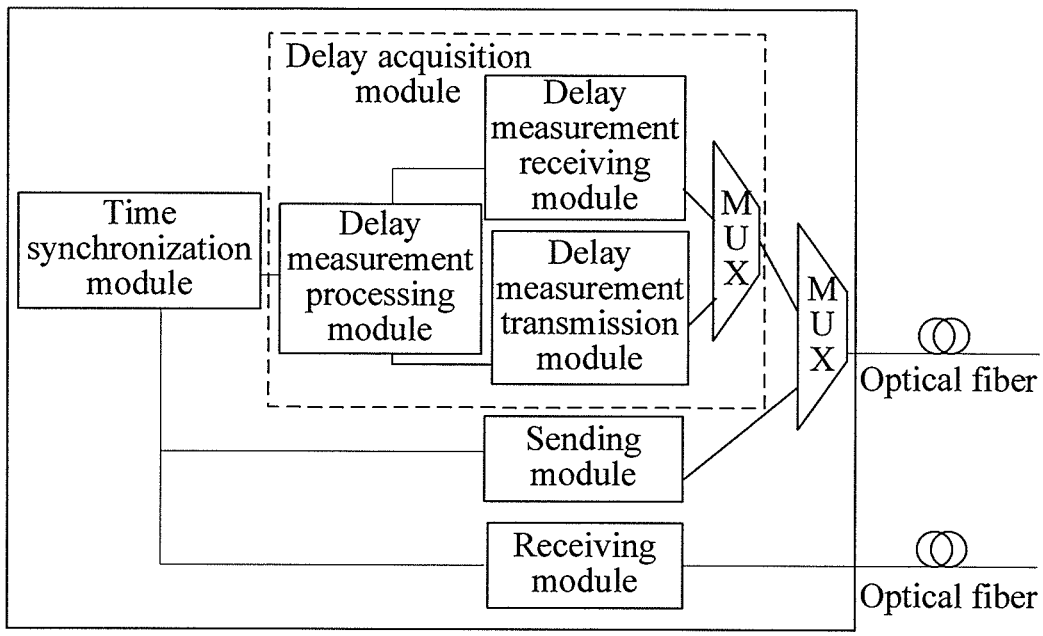

Further, as shown in FIG. 9e, the optical fiber transmission delay measurement module may be formed of a delay measurement transmission module, a delay measurement receiving module, and a delay measurement processing module.

The delay measurement transmission module is triggered by the delay measurement processing module to send a delay measurement signal. The delay measurement signal may be a single pulse signal, may be a pseudo-random noise (PN) sequence, and may also be a Goray code. Because the optical fiber transmission delay measurement module and the sending module share one optical fiber, the two may be distinguished by a wavelength of an optical signal. For example, the sending module adopts a wavelength of 1490 nm to transmit a data signal, and the delay measurement transmission module may adopt a wavelength of 1625 nm or 1650 nm to transmit a delay measurement signal. The optical fiber transmission delay measurement module and the sending module may perform multiplexing by using a wavelength division multiplexer (WDM).

The delay measurement receiving module is configured to receive a reflected signal of the delay measurement signal through the optical fiber, perform optical-to-electrical conversion (O/E conversion) on the reflected signal of the delay measurement signal through the optical fiber, and perform corresponding filtering processing and analog-to-digital conversion (A/D conversion) to generate a digital signal, and output the digital signal to the delay measurement processing module. The delay measurement transmission module and the receiving module may perform multiplexing by using an optical splitting device (for example, an optical splitter).

The delay measurement processing module processes and analyzes the signal output by the delay measurement receiving module, determines a transmission delay of the optical fiber according to a time difference between arrival time of the reflected signal and sending time of the delay measurement signal, and outputs the transmission delay which is of the optical fiber and obtained through analyzing to the time synchronization module.

Figure 9F:
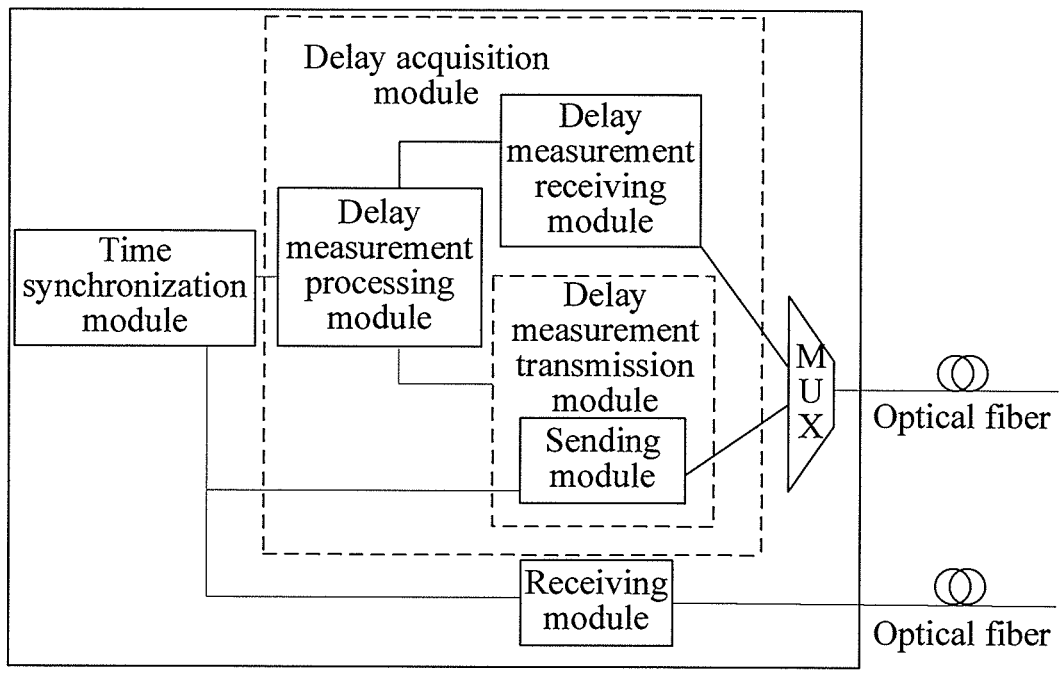

Further, the delay measurement transmission module may be shared with the sending module, which is as shown in FIG. 9f.

In this case, other data sending functions may be stopped, and a data transmission module (the delay measurement transmission module) only sends the delay measurement signal. Other data sending functions may also not be stopped, and the data signal and the delay measurement signal are superposed in a re-modulation manner and then sent to the optical fiber.

Figure 9G:
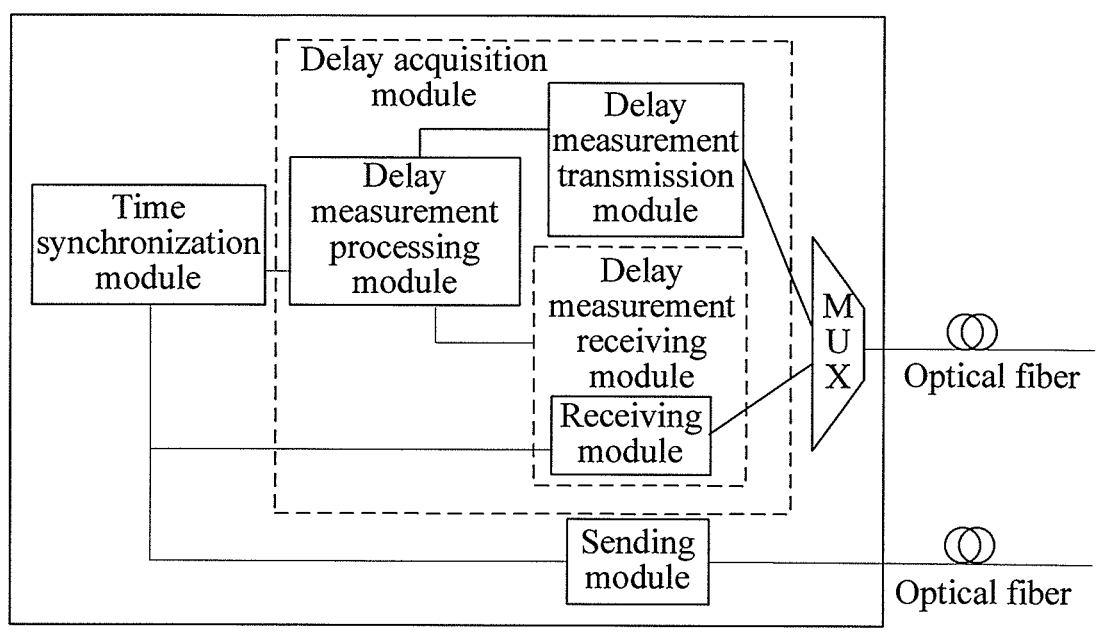

Further, the delay measurement receiving module may be shared with the receiving module, which is as shown in FIG. 9g.

In this case, a time synchronization module of a local device (for example, the master device) may transmit a delay measurement instruction message to a peer device (for example, the slave device) through a sending module, and instruct the peer device to stop transmitting data. Then, the local device stops receiving other data signals, and only receives a reflected signal of the delay measurement signal through the optical fiber. After delay measurement is completed, the time synchronization module transmits a delay measurement instruction message to the peer device through the sending module, and instructs the peer device to re-transmit data.

In the time synchronization system provided by this manner, the optical fiber transmission delay measurement module is disposed in both the master device and the slave device. In this case, a working principle of the system is as follows.

The first time synchronization module of the master device sends, through the first sending module, the first optical fiber transmission delay d1 from the master device to the slave device to the optical fiber connected to the first time synchronization module. The second time synchronization module of the slave device receives the first optical fiber transmission delay d1 from the master device through the second receiving module, and stores the first optical fiber transmission delay d1. The first time synchronization module sends the time synchronization message to the slave device through the first sending module, and sends the time synchronization message sending time to the slave device. The second time synchronization module receives the time synchronization message from the master device through the second receiving module, and records the time synchronization message arrival time. The second time synchronization module sends the delay request message to the master device through the second sending module, and records the delay request message sending time at the same time. The first time synchronization module receives the delay request message from the slave device through the first receiving module, and records the delay request message arrival time. The first time synchronization module sends, through the first sending module, the recorded delay request message arrival time to the optical fiber connected to the first time synchronization module. The second time synchronization module receives the delay response message from the master device through the second receiving module, and extracts the delay request message arrival time. The second optical fiber transmission delay measurement module measures the optical fiber transmission delay from the slave device to the master device, and outputs the measured second optical fiber transmission delay d2 from the slave device to the master device to the second time synchronization module. The two time synchronization modules calculate a time offset between the slave device and the master device according to the acquired first optical fiber transmission delay from the master device to the slave device, the second optical fiber transmission delay from the slave device to the master device, the time synchronization message sending time, the time synchronization message arrival time, the delay request message sending time, and the delay request message receiving time, adjust a clock of the slave device, and complete the time synchronization. A specific calculation method is the same as that in the foregoing embodiments, which is not repeatedly described here.

Figure 9H:
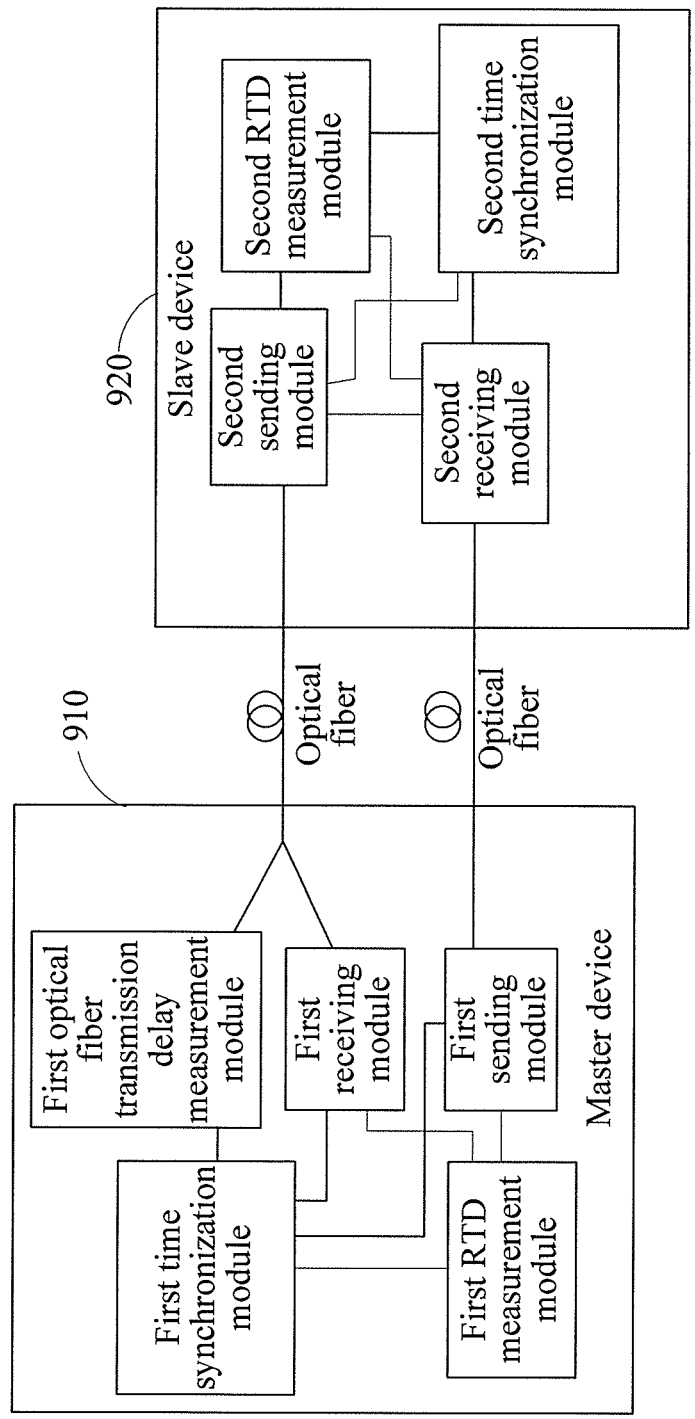

Referring to FIG. 9h, an embodiment provides another time synchronization system.

A difference between the time synchronization system provided by this embodiment and the time synchronization system shown in FIG. 9b lies in that, a slave device has no optical fiber transmission delay measurement module, a first optical fiber transmission delay measurement module is only disposed in a master device, a second RTD measurement module is disposed in the slave device, and a first RTD measurement module is disposed in the master device correspondingly.

In this case, in the slave device, a second transceiver module 820b may be further configured to receive an optical fiber transmission delay message sent by the master device, where the optical fiber transmission delay message carries a first optical fiber transmission delay d1 measured by the master device by using an optical fiber transmission delay measurement function of the master device;

the second RTD measurement module may be configured to send a round trip delay RTD measurement request message to the master device through a second sending module, and record RTD measurement request message sending time t-rtd-s; receive an RTD measurement response message replied by the master device through a second receiving module, and record RTD measurement response message arrival time t-rtd-r; and calculate a second optical fiber transmission delay d2 according to the first optical fiber transmission delay d1, the RTD measurement request message sending time t-rtd-s, and the RTD measurement response message arrival time t-rtd-r;

alternatively, the second RTD measurement module may be configured to acquire delay response message sending time t5 carried in a delay response message, and delay response message arrival time t6; and calculate a second optical fiber transmission delay d2 according to the first optical fiber transmission delay d1, delay request message sending time t3, delay request message arrival time t4, the delay response message sending time t5, and the delay response message arrival time t6; and the second time synchronization module may be configured to calculate an initial time offset offset1, and adjust the initial time offset offset1 by using the first optical fiber transmission delay d1 and the second optical fiber transmission delay d2 to obtain a corrected time offset offset2; and adjust a local clock according to the corrected time offset offset2, and complete time synchronization.

The master device is configured to exchange an optical fiber transmission delay measurement signal and a time synchronization signal with the slave device. For example, a first time synchronization module measures the first optical fiber transmission delay d1 from the master device to the slave device; and a first transceiver module sends the optical fiber transmission delay message carrying the first optical fiber transmission delay d1 to the slave device, receives the round trip delay RTD measurement request message sent by the slave device, and replies the RTD measurement response message generated by the first RTD measurement module to the slave device.

Figure 9I:
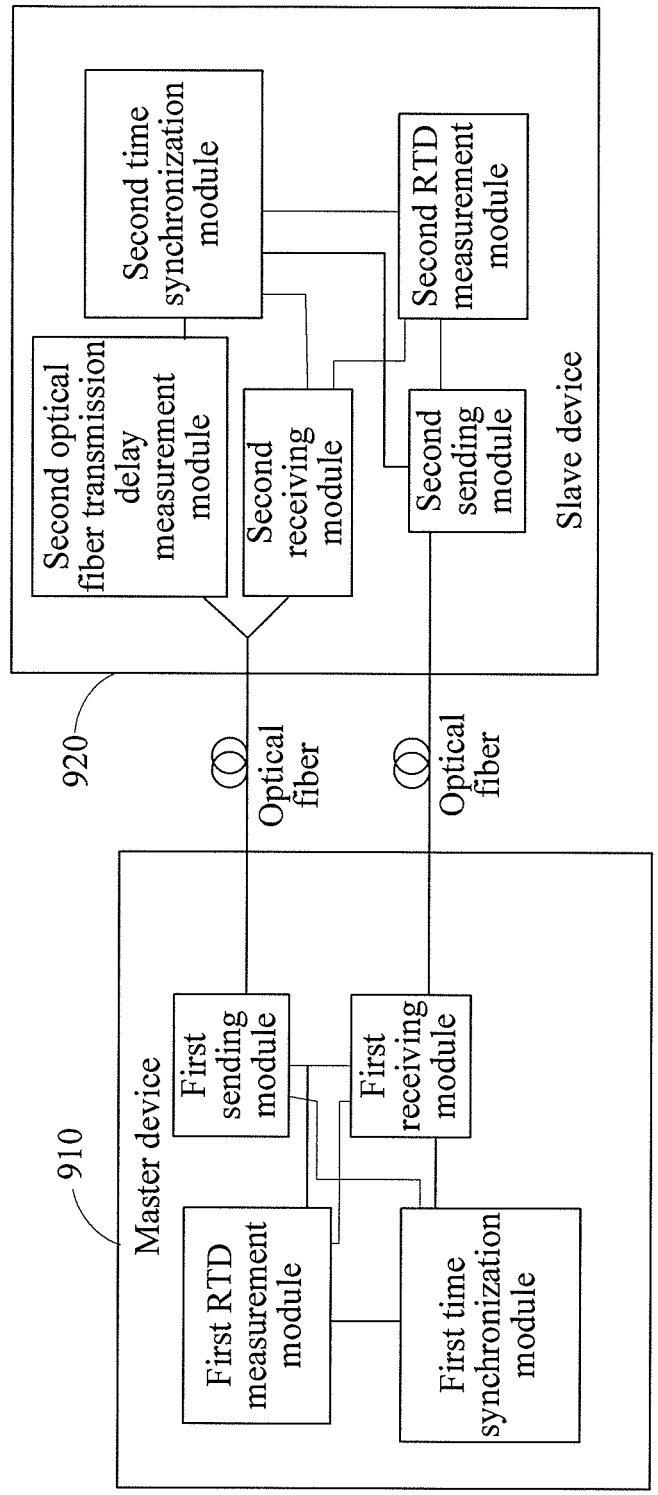

Referring to FIG. 9i, an embodiment of the present disclosure further provides a time synchronization system.

A difference between the time synchronization system provided by this embodiment and the time synchronization system shown in FIG. 9b lies in that, a second optical fiber transmission delay measurement module and a second RTD measurement module are disposed in a slave device, and a first RTD measurement module is disposed in a master device correspondingly without an optical fiber transmission delay measurement module.

In this case, in the slave device, the second optical fiber transmission delay measurement module is configured to measure a second optical fiber transmission delay d2 from the slave device to the master device;

the second RTD measurement module is configured to send a round trip delay RTD measurement request message to the master device through a transceiver module, and record RTD measurement request message sending time t-rtd-s; receive an RTD measurement response message replied by the master device through the transceiver module, and record RTD measurement response message arrival time t-rtd-r; and calculate a first optical fiber transmission delay d1 according to the second optical fiber transmission delay d2, the RTD measurement request message sending time t-rtd-s, and the RTD measurement response message arrival time t-rtd-r;

alternatively, the second RTD measurement module is configured to acquire delay response message sending time t5 carried in a delay response message, and delay response message arrival time t6; and calculate a first optical fiber transmission delay d1 according to the second optical fiber transmission delay d2, delay request message sending time t3, delay request message arrival time t4, the delay response message sending time t5, and the delay response message arrival time t6; and a second time synchronization module is configured to calculate an initial time offset offset1, and adjust the initial time offset offset1 by using the first optical fiber transmission delay d1 and the second optical fiber transmission delay d2 to obtain a corrected time offset offset2; and adjust a local clock according to the corrected time offset offset2, and complete time synchronization.

The master device is configured to exchange an optical fiber transmission delay measurement signal and a time synchronization signal with the slave device. For example, a first transceiver module receives the round trip delay RTD measurement request message sent by the slave device, and replies the RTD measurement response message generated by the first RTD measurement module to the slave device.

In the foregoing, the embodiment of the present disclosure provides the time synchronization system. The slave device in the system may acquire the first optical fiber transmission delay d1 and the second optical fiber transmission delay d2 between the master and slave devices, so as to correct a time offset, adjust the local clock, and complete the time synchronization. Therefore:

a time synchronization error caused by asymmetry of a network, specifically, asymmetry of signal reception and transmission of the optical fibers, may be effectively eliminated; and online time synchronization compensation may be implemented in a time synchronization process, and at the time of deployment, network acceptance and change of a network structure, a time synchronization compensation operation does not need to be performed on each station manually.

Compared with a time synchronization compensation operation performed manually in the prior art, the technical solution in this embodiment has high measurement precision, high accuracy, a short cycle and a low cost, and requires few manpower and material resources. A project implementation problem of IEEE 1588V2 deployment is solved, and a scale project deployment capability is achieved.

Persons of ordinary skill in the art should understand that all or part of the steps of the methods in the foregoing embodiments may be implemented by hardware, and may also be implemented by a program instructing relevant hardware. The program may be stored in a computer readable storage medium, the storage medium may include a read only memory, a random access memory, a magnetic disk or an optical disk, and so on.

The time synchronization method, device, and system provided by the embodiments of the present disclosure are described in detail, and the description about the foregoing embodiments is merely provided to help understanding of the method and core ideas of the present disclosure, and shall not be construed as a limitation to the present disclosure. Various modifications and replacements that can be easily derived by persons skilled in the art without departing from the technical scope of the present disclosure should fall within the protection scope of the present disclosure.

What is claimed is:

1. A time synchronization method, comprising:
   acquiring, by a slave device, a first optical fiber transmission delay from a master device to the slave device, and a second optical fiber transmission delay from the slave device to the master device;
   exchanging a time synchronization signal with the master device;
   calculating an initial time offset, and adjusting the initial time offset by using the first optical fiber transmission delay and the second optical fiber transmission delay to obtain a corrected time offset; and
   adjusting a local clock according to the corrected time offset.

2. The method according to claim 1, wherein
   the exchanging the time synchronization signal with the master device comprises:
   receiving a time synchronization message sent by the master device, and recording time synchronization message arrival time, wherein the time synchronization message carries time synchronization message sending time;
   sending a delay request message to the master device, and recording delay request message sending time; and
   receiving a delay response message returned by the master device, wherein the delay response message carries delay request message arrival time, and
   the calculating the initial time offset comprises:
   calculating the initial time offset according to the time synchronization message sending time, the time synchronization message arrival time, the delay request message sending time, and the delay request message arrival time.

3. The method according to claim 2, wherein the acquiring, by the slave device, the first optical fiber transmission delay from the master device to the slave device, and the second optical fiber transmission delay from the slave device to the master device comprises:
   receiving, by the slave device, an optical fiber transmission delay message sent by the master device, wherein the optical fiber transmission delay message carries the first optical fiber transmission delay measured by the master device by using an optical fiber transmission delay measurement function of the master device; and
   starting, by the slave device, an optical fiber transmission delay measurement function of the slave device to measure the second optical fiber transmission delay from the slave device to the master device.

4. The method according to claim 2, wherein the acquiring, by the slave device, the first optical fiber transmission delay from the master device to the slave device, and the second optical fiber transmission delay from the slave device to the master device comprises:
   receiving, by the slave device, an optical fiber transmission delay message sent by the master device, wherein the optical fiber transmission delay message carries the first optical fiber transmission delay measured by the master device by using an optical fiber transmission delay measurement function of the master device;
   sending, by the slave device, a round trip delay (RTD) measurement request message to the master device, and recording RTD measurement request message sending time; and receiving an RTD measurement response message replied by the master device, and recording RTD measurement response message arrival time; and
   calculating, by the slave device, the second optical fiber transmission delay according to the first optical fiber transmission delay, the RTD measurement request message sending time, and the RTD measurement response message arrival time.

5. The method according to claim 2, wherein the acquiring, by the slave device, the first optical fiber transmission delay from the master device to the slave device, and the second optical fiber transmission delay from the slave device to the master device comprises:
   receiving, by the slave device, an optical fiber transmission delay message sent by the master device, wherein the optical fiber transmission delay message carries the first optical fiber transmission delay measured by the master device by using an optical fiber transmission delay measurement function of the master device;
   acquiring, by the slave device, delay response message sending time carried in the delay response message, and recording delay response message arrival time; and
   calculating the second optical fiber transmission delay according to the first optical fiber transmission delay, the delay request message sending time, the delay request message arrival time, the delay response message sending time, and the delay response message arrival time.

6. The method according to claim 2, wherein the acquiring, by the slave device, the first optical fiber transmission delay from the master device to the slave device, and the second optical fiber transmission delay from the slave device to the master device comprises:
  starting, by the slave device, an optical fiber transmission delay measurement function of the slave device to measure the second optical fiber transmission delay from the slave device to the master device;
  sending, by the slave device, a round trip delay (RTD) measurement request message to the master device, and recording RTD measurement request message sending time; and receiving an RTD measurement response message replied by the master device, and recording RTD measurement response message arrival time; and
  calculating, by the slave device, the first optical fiber transmission delay according to the second optical fiber transmission delay, the RTD measurement request message sending time, and the RTD measurement response message arrival time.

7. The method according to claim 2, wherein the acquiring, by the slave device, the first optical fiber transmission delay from the master device to the slave device, and the second optical fiber transmission delay from the slave device to the master device comprises:
  starting, by the slave device, an optical fiber transmission delay measurement function of the slave device to measure the second optical fiber transmission delay from the slave device to the master device;
  acquiring, by the slave device, delay response message sending time carried in the delay response message, and recording delay response message arrival time; and
  calculating, by the slave device, the first optical fiber transmission delay according to the second optical fiber transmission delay, the delay request message sending time, the delay request message arrival time, the delay response message sending time, and the delay response message arrival time.

8. A time synchronization device, comprising:
  a delay acquisition module, configured to acquire a first optical fiber transmission delay from a master device to a slave device, and a second optical fiber transmission delay from the slave device to the master device;
  a transceiver module, configured to exchange an optical signal with the master device, wherein the optical signal comprises a time synchronization signal; and
  a time synchronization module, configured to calculate an initial time offset, and adjust the initial time offset by using the first optical fiber transmission delay and the second optical fiber transmission delay to obtain a corrected time offset; and adjust a local clock according to the corrected time offset.

9. The device according to claim 8, wherein
the transceiver module is configured to receive a time synchronization message sent by the master device, wherein the time synchronization message carries time synchronization message sending time; send a delay request message to the master device; and receive a delay response message returned by the master device, wherein the delay response message carries delay request message arrival time; and
the time synchronization module is configured to record time synchronization message arrival time, and extract the time synchronization message sending time carried in the time synchronization message; record delay request message sending time; extract the delay request message arrival time carried in the delay response message; and calculate the initial time offset according to the time synchronization message sending time, the time synchronization message arrival time, the delay request message sending time, and the delay request message arrival time.

10. The device according to claim 9, wherein
the transceiver module is further configured to receive an optical fiber transmission delay message sent by the master device, wherein the optical fiber transmission delay message carries the first optical fiber transmission delay measured by the master device by using an optical fiber transmission delay measurement function of the master device; and
the delay acquisition module comprises: an optical fiber transmission delay measurement module, configured to measure the second optical fiber transmission delay from the slave device to the master device.

11. The device according to claim 9, wherein
the transceiver module is further configured to receive an optical fiber transmission delay message sent by the master device, wherein the optical fiber transmission delay message carries the first optical fiber transmission delay measured by the master device by using an optical fiber transmission delay measurement function of the master device; and
the delay acquisition module comprises: a round trip delay (RTD) measurement module, configured to send an RTD measurement request message to the master device through the transceiver module, and record RTD measurement request message sending time; receive an RTD measurement response message replied by the master device through the transceiver module, and record RTD measurement response message arrival time; and calculate the second optical fiber transmission delay according to the first optical fiber transmission delay, the RTD measurement request message sending time, and the RTD measurement response message arrival time.

12. The device according to claim 9, wherein
the transceiver module is further configured to receive an optical fiber transmission delay message sent by the master device, wherein the optical fiber transmission delay message carries the first optical fiber transmission delay measured by the master device by using an optical fiber transmission delay measurement function of the master device; and
the delay acquisition module comprises: a round trip delay (RTD) measurement module, configured to acquire delay response message sending time carried in the delay response message, and delay response message arrival time; and calculate the second optical fiber transmission delay according to the first optical fiber transmission delay, the delay request message sending time, the delay request message arrival time, the delay response message sending time t5, and the delay response message arrival time.

13. The device according to claim 9, wherein the delay acquisition module comprises:
  an optical fiber transmission delay measurement module, configured to measure the second optical fiber transmission delay from the slave device to the master device; and
  a round trip delay RTD measurement module, configured to send a round trip delay (RTD) measurement request message to the master device through the transceiver module, and record RTD measurement request message sending time; receive an RTD measurement response message replied by the master device through the transceiver module, and record RTD measurement response message arrival time; and calculate the first optical fiber transmission delay according to the second optical fiber transmission delay, the RTD measurement request message sending time, and the RTD measurement response message arrival time.

14. The device according to claim 9, wherein the delay acquisition module comprises:
   an optical fiber transmission delay measurement module, configured to measure the second optical fiber transmission delay from the slave device to the master device; and
   a round trip delay (RTD) measurement module, configured to acquire delay response message sending time carried in the delay response message, and delay response message arrival time t6; and calculate the first optical fiber transmission delay according to the second optical fiber transmission delay, the delay request message sending time, the delay request message arrival time t4, the delay response message sending time, and the delay response message arrival time.

15. A time synchronization system, comprising:
   a master device and a slave device connected through an optical fiber, wherein
   the slave device is configured to exchange an optical fiber transmission delay measurement signal and a time synchronization signal with the master device, and acquire a first optical fiber transmission delay from the master device to the slave device and a second optical fiber transmission delay from the slave device to the master device; calculate an initial time offset offset1; adjust the initial time offset by using the first optical fiber transmission delay and the second optical fiber transmission delay to obtain a corrected time offset; and adjust a local clock according to the corrected time offset; and
   the master device is configured to exchange the optical fiber transmission delay measurement signal and the time synchronization signal with the slave device.

* * * * *